(12) United States Patent
Mercier des Rochettes et al.

(10) Patent No.: US 8,205,840 B2
(45) Date of Patent: Jun. 26, 2012

(54) ELONGATED, TORSION-DEFORMABLE AERODYNAMIC ELEMENT

(75) Inventors: Hugues Mercier des Rochettes, Bondues (FR); Didier Joly, Sainghin en Weppes (FR); Léon Buchaniek, Quesnoy-sur-Deule (FR)

(73) Assignee: Office National d'Etudes et de Recherches Aerospatiales, Chatillon Cedex (FR)

( * ) Notice: Subject to any disclaimer, the term of this patent is extended or adjusted under 35 U.S.C. 154(b) by 244 days.

(21) Appl. No.: 12/745,938

(22) PCT Filed: Dec. 3, 2008

(86) PCT No.: PCT/FR2008/001681
§ 371 (c)(1),
(2), (4) Date: Jun. 3, 2010

(87) PCT Pub. No.: WO2009/103865
PCT Pub. Date: Aug. 27, 2009

(65) Prior Publication Data
US 2010/0258680 A1   Oct. 14, 2010

(30) Foreign Application Priority Data
Dec. 5, 2007 (FR) .................................... 07 08491

(51) Int. Cl.
*B64C 3/52* (2006.01)

(52) U.S. Cl. ..... 244/201; 244/219; 244/99.8; 416/229 R
(58) Field of Classification Search ................ 244/198, 244/201, 203, 204, 219, 99.2, 99.3, 99.8; 416/132 R, 132 A, 3, 229 R, 238
See application file for complete search history.

(56) References Cited

U.S. PATENT DOCUMENTS

| | | | |
|---|---|---|---|
| 2,288,750 A * | 7/1942 | Seeman | 244/219 |
| 4,655,685 A | 4/1987 | Fradenburgh | |
| 4,890,803 A * | 1/1990 | Smith | 244/219 |
| 5,137,228 A | 8/1992 | Vaughen | |
| 5,440,193 A * | 8/1995 | Barrett | 310/328 |
| 6,286,789 B1 * | 9/2001 | Shimovetz | 244/201 |
| 6,425,553 B1 * | 7/2002 | Smith et al. | 244/130 |
| 7,726,603 B2 * | 6/2010 | Mercier Des Rochettes et al. | 244/99.8 |
| 2006/0239824 A1 | 10/2006 | Robertson et al. | |
| 2007/0205332 A1 | 9/2007 | Mercier Des Rochettes et al. | |

\* cited by examiner

*Primary Examiner* — Joshua J Michener
*Assistant Examiner* — Brian M O'Hara
(74) *Attorney, Agent, or Firm* — Novak Druce + Quigg LLP

(57) ABSTRACT

The invention relates to an elongated, torsion-deformable aerodynamic element, in which the upper surface (2) is continuous while the lower surface (3) comprises a longitudinal slot (6) in the direction of the span and in the vicinity of the leading edge (4). Furthermore, an actuator device (14) inside said aerodynamic element is capable of sliding the edges (6A and 6R) of the slot (6) relative to each other.

12 Claims, 4 Drawing Sheets

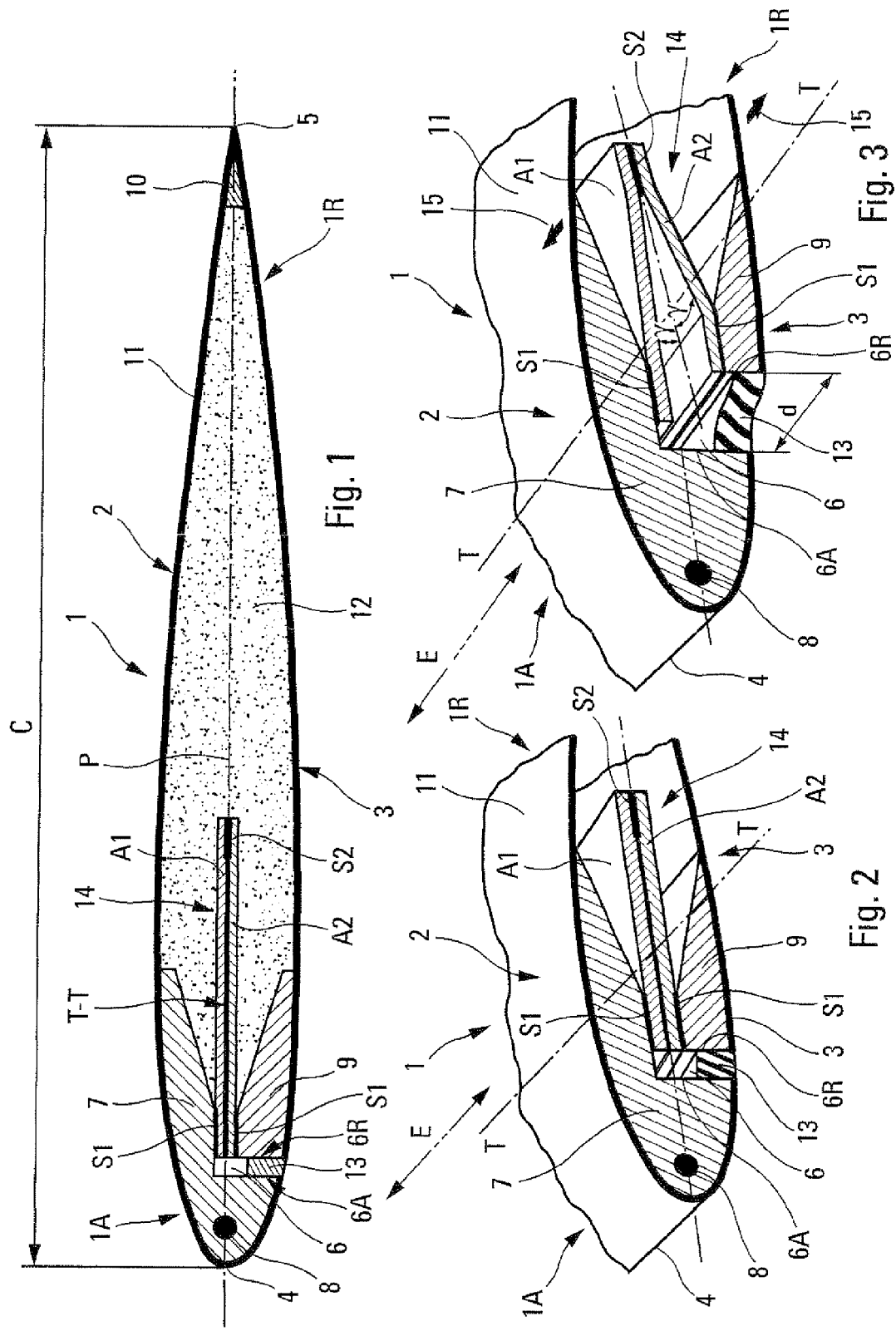

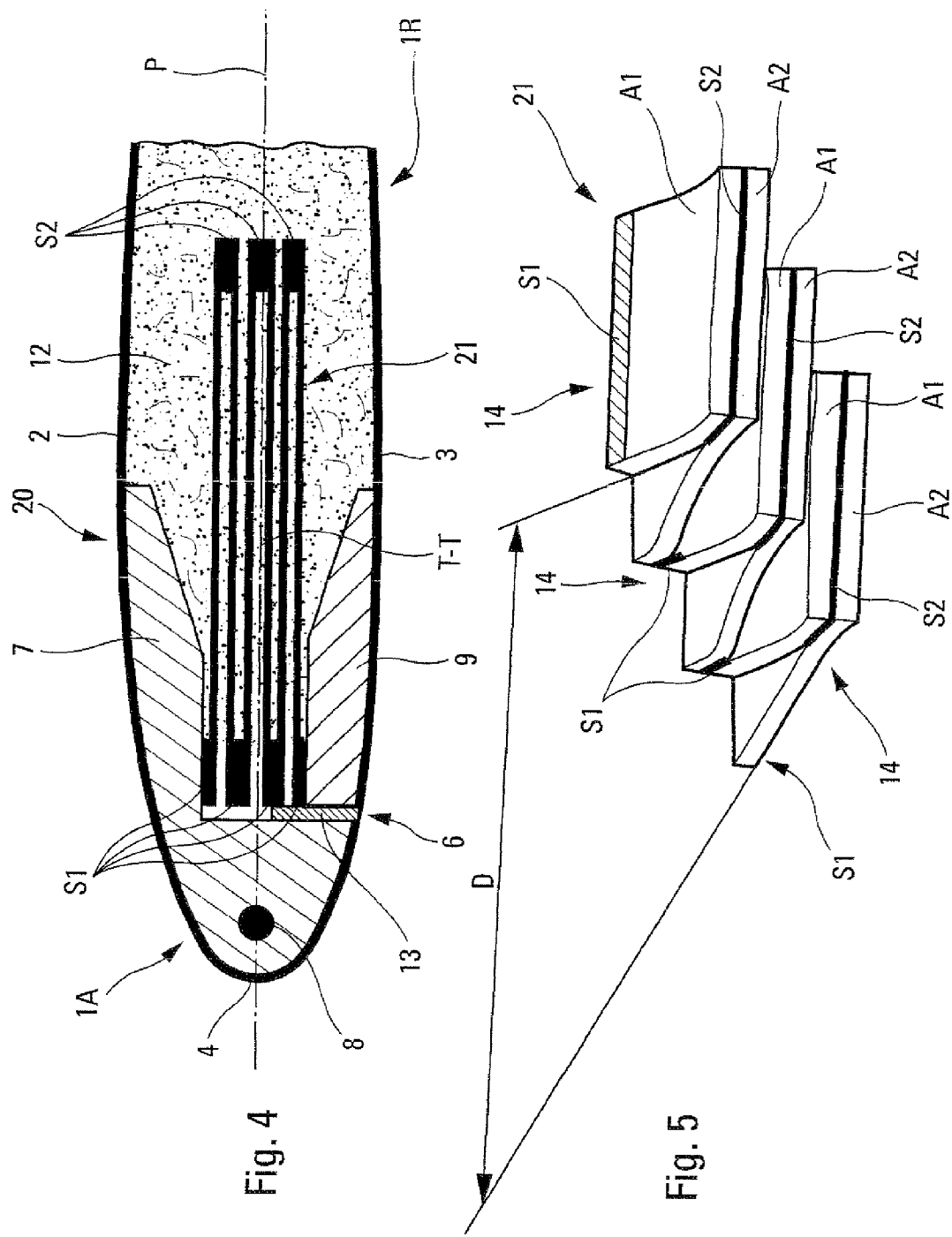

ELONGATED, TORSION-DEFORMABLE AERODYNAMIC ELEMENT

CROSS-REFERENCE TO RELATED APPLICATIONS

This application is a §371 national stage entry of International Application No. PCT/FR2008/001681, filed Dec. 3, 2008, which claims priority to French Patent Application 0708491, filed Dec. 5, 2007, the entire contents of which are incorporated herein by reference.

FIELD OF THE INVENTION

This invention relates to an elongated aerodynamic element, such as an aircraft wing or a rotary wing blade, capable of being both statically and dynamically torsion-deformable.

BACKGROUND OF THE INVENTION

From American document U.S. Pat. No. 5,137,228, it is already known a rotary wing blade capable of being torsion-deformed about an axis at least approximately along the direction of the span of said blade and comprising, connected to each other, a front longitudinal portion comprising the leading edge and a rear longitudinal portion comprising the trailing edge. In this known blade, said longitudinal portions are connected through a spar and are separated from each other by two longitudinal slots, provided in the upper surface and the lower surface of said blade, respectively. The blade torsion is controlled by actuating means located at the bottom of the blade and carried by the mast of the rotary wing. When said actuating means control the blade torsion, the result is a relative sliding of said longitudinal portions along said slots.

This prior art US document seeks torsion stiffness negligible for said blade on purpose, which is achieved because the blade cross-section is dually opened by said longitudinal slots of upper and lower surfaces. The result is that the first torsion mode of said blade is very low, which makes monocyclic control of blade pitch likely to be difficult upon a forward flight. Such a blade can therefore only be operated in adaptive twist (quasi-static twist) and not in active (dynamic) twist.

Moreover, because the actuating means are concentrated at the bottom of the blade, the torsion force is located at this place so that the torsion angle caused by this force is (increasingly or decreasingly) monotonic along said blade.

SUMMARY OF THE INVENTION

The object of this invention is to remedy such drawbacks by providing an elongated aerodynamic element which is sufficiently torsion stiff to be controlled not only in static twist, but also in active twist and enabling a local control of the torsion angle of the blade, along the same.

For this purpose, according to the invention, the elongated aerodynamic element, such as an aircraft wing or a rotary wing blade, provided with an upper aerodynamic surface and a lower aerodynamic surface having therebetween a leading edge and a trailing edge, said aerodynamic element being able to be torsion-deformed about an axis at least approximately along the direction of the span of said aerodynamic element and comprising, connected to each other, a front longitudinal portion comprising said leading edge and a rear longitudinal portion comprising said trailing edge, a torsion of said aerodynamic element being associated with a relative sliding of said longitudinal portions at least substantially parallel to said span, is remarkable in that:

one of said aerodynamic surfaces is continuous and performs a linking between said front and rear longitudinal portions;

the other of said aerodynamic surfaces is partitioned, on said leading edge side, by a longitudinal slot at least approximately along the direction of said span and separating said front and rear longitudinal portions from each other, with one of the edges of said slots being part of one of said longitudinal portions whereas the other of said edges is part of the other longitudinal portion; and inside said aerodynamic element, actuating means are provided being capable of causing a relative sliding between said edges of the slot.

Thus, in the aerodynamic element of the invention, because both longitudinal portions are connected to each other by one of the aerodynamic (upper or lower) surfaces thereof and the edges of said longitudinal slot are connected by said actuating means, the torsion stiffness of said element can be adjusted to a sufficient value to enable a dynamic twist. Further, said actuating means being now an integral part of said aerodynamic element instead of being located outside the latter, they can be distributed inside said aerodynamic element, along the span thereof, in order to reach any desired distribution of torsion angle in span.

It will also be noticed that, in this invention, the relative sliding of said longitudinal portions is the cause of said twist of said aerodynamic element, whereas in the blade of U.S. Pat. No. 5,137,228, such sliding is a consequence thereof.

Although said continuous aerodynamic surface can be the lower surface of said aerodynamic element, it is advantageous that the upper surface of the latter be continuous and that said longitudinal slot be within said lower surface. Moreover, said longitudinal slot is preferably sealed by a tape of a low elasticity modulus material, for example an elastomer. Thus, said tape insulates the inside of said aerodynamic element while enabling, by being elastically shear deformed, a relative sliding of the edges of said longitudinal slot.

Said inner actuating means of the aerodynamic element in accordance with this invention can be of any desired nature (electrical, mechanical, hydraulic . . . ) and can either be evenly distributed, or distributed in units, along the span of said aerodynamic element.

In one advantageous embodiment, said actuating means are of the piezoelectric type and, preferably, in accordance with the planar actuator device with a sandwich structure described in European document EP-1,788,646. Then, they are in a form of a multilayer plate able to be submitted to a planar shear deformation. They can then be provided at least partly in the chord plane of said aerodynamic element.

It will be noticed that this European document also describes applying such multilayer flat actuator device to the twisting of an aerodynamic element. However, in this case, said actuator device is arranged in the vicinity of the open trailing edge of said aerodynamic element, between the upper surface and lower surface skins of said trailing edge. Several drawbacks result from such arrangement.

Indeed, it is known that, in the case of said aerodynamic element being a rotary wing blade, it is important that, in the current section of the profile, the mass balance, the pitch line of flapping and drag stiffness (the locus of null normal stresses) and the torsion elastic axis are centred 25% from the chord of the profile from the leading edge. Such 25% centring corresponds to the aerodynamic focus of the profile on which the collective and cyclic pitch axis of the blade is located. These balances and the one of the torsion elastic centre are those which enable the couplings between the flapping and torsion modes to be avoided. Indeed, upon dynamic excitation of the actuator device, the blade should be torsion strained as purely as possible in order to minimise the induced flapping.

These (mass, neutral and elastic) balances are, in the case of the application of EP-1,788,646, difficult to carry out because of the very much backward chord location of the actuator device and because of the cutoff at the trailing edge along the span.

Besides, both open edges of the trailing edge should be stiffened in order to transmit the shearing to the whole structure of the aerodynamic element and avoid an only local shear deformation. Moreover, these open edges tend to space apart from each other under some aerodynamic effects.

With this invention, the drawbacks of prior art represented by document EP-1,788,646 are also remedied.

Indeed, according to the invention, the trailing edge is closed and said inner actuating means can be located, regardless of the nature thereof (piezoelectric, electrical, hydraulic, mechanical, for the torsion axis to be provided in the chord plane of said aerodynamic element and for, in such plane, the distance between said axis and the leading edge to be at least approximately equal to one fourth of the chord of the profile in said aerodynamic element.

As mentioned above, the inner actuating means can have another structure than a piezoelectric one, particularly when a high output is required.

For example, said inner actuating means can include a plurality of hydraulic units distributed along said elongated aerodynamic element. Each hydraulic unit can include two antagonistic jacks, integral with one of said longitudinal portions of said aerodynamic element and cooperating for moving a slider, being integral with the other longitudinal portion, in parallel to the span of said aerodynamic element. Again, said hydraulic units can be provided such that the torsion axis is in the chord plane at 25% from the chord. The different hydraulic units can be supplied with hydraulic fluid in parallel and can generate different local torsion angles depending on the position thereof along the span.

In yet a further alternative embodiment, said inner actuating means can include a plurality of mechanical units, equally distributed along said elongated aerodynamic element. Each mechanical unit can include an eccentric rotatably mounted with respect to one of the longitudinal portions of said aerodynamic element and cooperating with the other of said longitudinal portions in order to generate the relative sliding of the latter. As stated above, said mechanical units can be provided such that the torsion axis is in the chord plane at 25% from the chord. Said eccentrics can be controlled together by a control rod slidingly guided in said longitudinal portion on which said eccentrics are rotatably mounted. By individually adjusting said eccentrics, said mechanical units can also generate different local torsion angles depending on the position thereof along the span.

BRIEF DESCRIPTION OF THE DRAWINGS

The figures of the appended drawings will help better understand how the invention can be carried out. In these figures, identical references denote similar elements.

FIG. 1 is a schematic section, transverse to the span, of an elongated aerodynamic element with piezoelectric actuating means, in accordance with this invention.

FIG. 2 is a schematic and partial top and front perspective view, on a larger scale and in section, of the aerodynamic element of FIG. 1.

FIG. 3 illustrates, in a similar view as FIG. 2, the action of the piezoelectric inner actuating means of said aerodynamic element.

FIG. 4 illustrates, in a partial schematic section, an alternative embodiment of the piezoelectric actuating means of the elongated aerodynamic element of FIGS. 1 to 3.

FIG. 5 schematically illustrates the action of the actuating means of the elongated aerodynamic element of FIG. 4.

DETAILED DESCRIPTION

Figure 6:
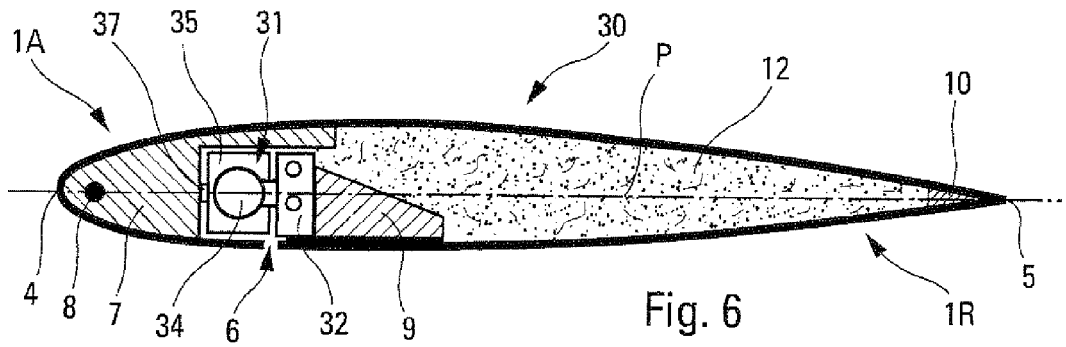
FIG. 6 shows a section of an elongated aerodynamic element in accordance with this invention and provided with hydraulic actuating means.

The elongated aerodynamic element 1, shown in FIGS. 1 to 3 (FIG. 1 being a section transverse to the span E thereof), is for example an aircraft wing or a rotary wing blade. It has an upper surface 2 and a lower surface 3 providing, in the front portion, a leading edge 4 and, in the rear portion, a trailing edge 5.

In the vicinity of the leading edge 4, the lower surface 3 is kept by a longitudinal slot 6 longitudinally partitioning said aerodynamic element 1 (along the span E) into a front longitudinal portion 1A including said leading edge 4 and a rear longitudinal portion 1R including said trailing edge 5. On the other hand, said front 1A and rear 1R longitudinal portions are integral with each other through the upper surface 2 which is continuous.

In the example shown in FIGS. 1 to 3, said aerodynamic element 1 includes:
  a leading edge spar 7, providing said leading edge 4 and the portions of the upper surface 2 and the lower surface 3 in the vicinity thereof; such spar 7 can be made of a fibre-resin composite material (for example glass-epoxy or carbon-epoxy) and optionally incorporate a ballast weight 8, extended along said leading edge 4;
  a lower surface spar 9, separated from said leading edge spar 7 by said lower surface longitudinal slot 6, with the front edge 6A thereof being formed by a longitudinal transverse face of the leading edge spar 7 whereas the rear edge 6R of said longitudinal slot 6 is formed by a longitudinal transverse face of said lower surface spar 9; the latter can also be made from a fibre-resin composite material;
  a hip edge spar 10 providing the trailing edge 5, and made for example from a fibre-resin composite material;
  a shell 11 providing the upper surface 2 and the lower surface 3 (interrupted by the slot 6) and surrounding the spars 7, 9 and 10, while being integral therewith;
  an expanded foam 12, for example of polyurethane, filling said shell 11 (it should be noticed that, for the sake of clarity of the drawing, filling of the foam 12 is not shown in FIGS. 2 and 3); and
  a tape 13 of an elastomer material with a low elasticity modulus, sealing the slot 6 and being integral (preferably by bonding) with the edges 6A and 6R thereof.

Further, inside the shell 11 is provided, preferably at least partly in the chord plane P of the element 1, a piezoelectric planar actuator device 14 similar to the one described in document EP-1,788,646, which is herein referred to.

This known actuator device 14 includes two superimposed planar actuators A1 and A2 with a sandwich structure, made integral to each other by, for example, bonding along an elongated edge area S2 and each including an elongating edge area S1, opposed and parallel to said area S2. As explained in document EP-1,768,646, when the planar actuators A1 and A2 are actuated, they generate planar shearing with an angular amplitude $2\gamma$, resulting in a relative sliding with an amplitude d between both elongated edge areas S1 (see FIG. 3).

In the aerodynamic element 1, the actuator device 14 is mounted such that the elongated edge areas S1 and S2 are directed along the span E, the area S1 of actuator A1 being integral with the leading edge spar 7, whereas the area S1 of actuator A2 being integral with the lower surface spar 9. For this purpose, said spars 7 and 9 can provide therebetween a longitudinal gap in which said areas S1 of actuators A1 and A2 are inserted.

Thus, as shown in FIG. 3, when said actuators A1 and A2 are actuated, the sliding d is directed along the span E and transmitted to the spars 7 and 9 which move relatively to each other. This therefore results in a relative movement between the front portion 1A and the rear portion 1R (as depicted by arrows 15 in FIG. 3) and a warping of the shell 11, reflected by a torsion deformation of the element 1 about a torsion axis T-T provided in the chord plane P and directed along the span E. Of course, the tape 13 also undergoes a shear deformation (see FIG. 3).

It will be noticed that, from the mechanical point of view, the actuator device 14 "closes" the slot 6, such that the shearing stiffness of said actuator device mostly influences the torsion stiffness of the aerodynamic element 1.

In order to achieve the desired torsion, there can be used either a single actuator device 14 extending over the entire span E of the aerodynamic element 1, or a plurality of actuator devices 14 distributed along said span E.

In the case of the aerodynamic element 1 being a rotary wing blade, it is advantageous, for the above stated reasons, that in the chord plane P, the distance from the torsion axis T-T to the leading edge 4 be at least approximately 25% of the chord C of said blade.

For some applications, the displacement d achieved by implementing the actuator device 14 might be found insufficient. In this case, as shown in FIGS. 4 and 5, the alternative embodiment 20 of the aerodynamic element according to this invention and in accordance with any other aspect to the aerodynamic element 1 is such as to implement several actuator devices 14 superimposed and connected by the areas S1 of the actuators A1 and A2 of adjacent actuator devices 14 in order to provide a single actuator device 21 capable of having a higher shearing stroke.

As shown in FIG. 5, if the actuator device 21 is made of three actuator devices 14, the shearing stroke D thereof can be three times higher than the shearing stroke d of only one actuator device 14. The actuator device 21 being thick, it cannot be "within" the chord plane P; it is therefore provided in parallel to said chord plane P, on either side thereat and, in the case of the aerodynamic element 20 being a rotary wing blade, the position thereof is selected such that the torsion axis T-T is at a distance C/4 from the leading edge 4.

Figure 7:
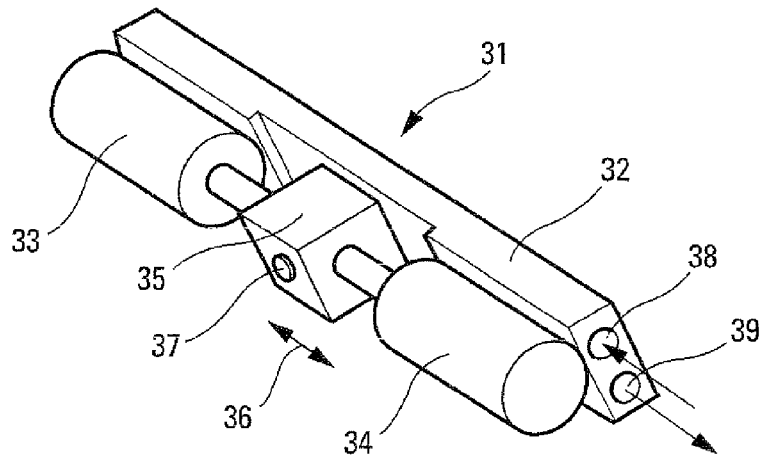
FIG. 7 is a schematic perspective view of the hydraulic actuating means of the elongated aerodynamic element of FIG. 6.

The aerodynamic element 30, shown in section transversal to the span E thereof in FIG. 6, is entirely identical to the aerodynamic elements 1 and 20 described above, except as regards said actuating means. Indeed, the aerodynamic element 30 is provided with a plurality of actuator devices 31 (or units), of the hydraulic type, distributed along the span E thereof. A single actuator device 31 can be seen in the section of FIG. 6 and FIG. 7 illustrates in a schematic perspective view the structure of such an actuator device 31. Each actuator device 31 includes a base 32, supporting two antagonistic hydraulic jacks 33 and 34 with a slider 35 provided therebetween. It will be readily understood that the slider 35 can, under the action of the jacks 33 and 34, be moved according to a rectilinear sliding symbolised by the double arrow 36.

Each actuator device 31 is provided within the aerodynamic element 30 such that the reciprocating sliding direction 36 is parallel to the span E, the base 32 being integral with the lower surface spar 9 (and therefore with the rear longitudinal portion 1R), whereas the slider 35 is made integral (in 37) with the leading edge spar 7 (and therefore with the front longitudinal portion 1A). The jacks 33 and 34 can be supplied with hydraulic fluid through pipes 38, 39 crossing said bases 32 and all the actuator devices 31 can be supplied in parallel.

Figure 9:
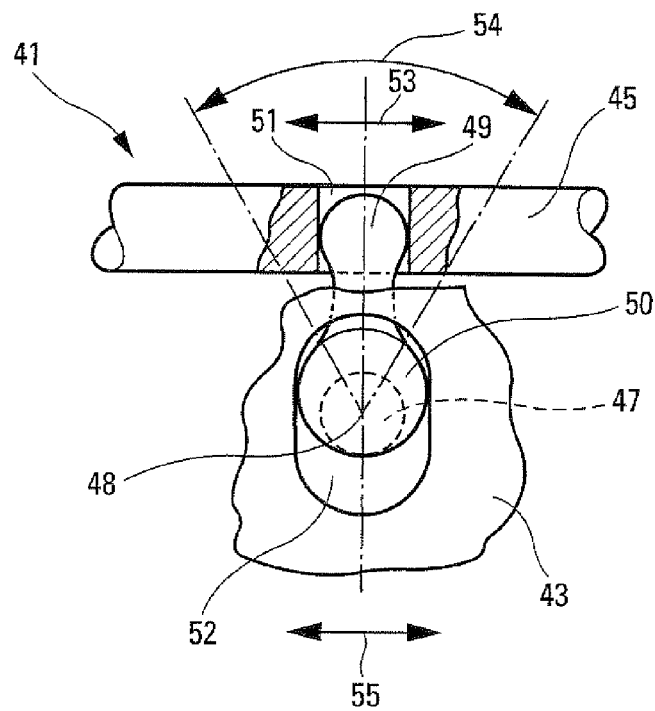
FIG. 9 schematically illustrates the operation of the mechanical actuating means of FIG. 8.
Figure 8:
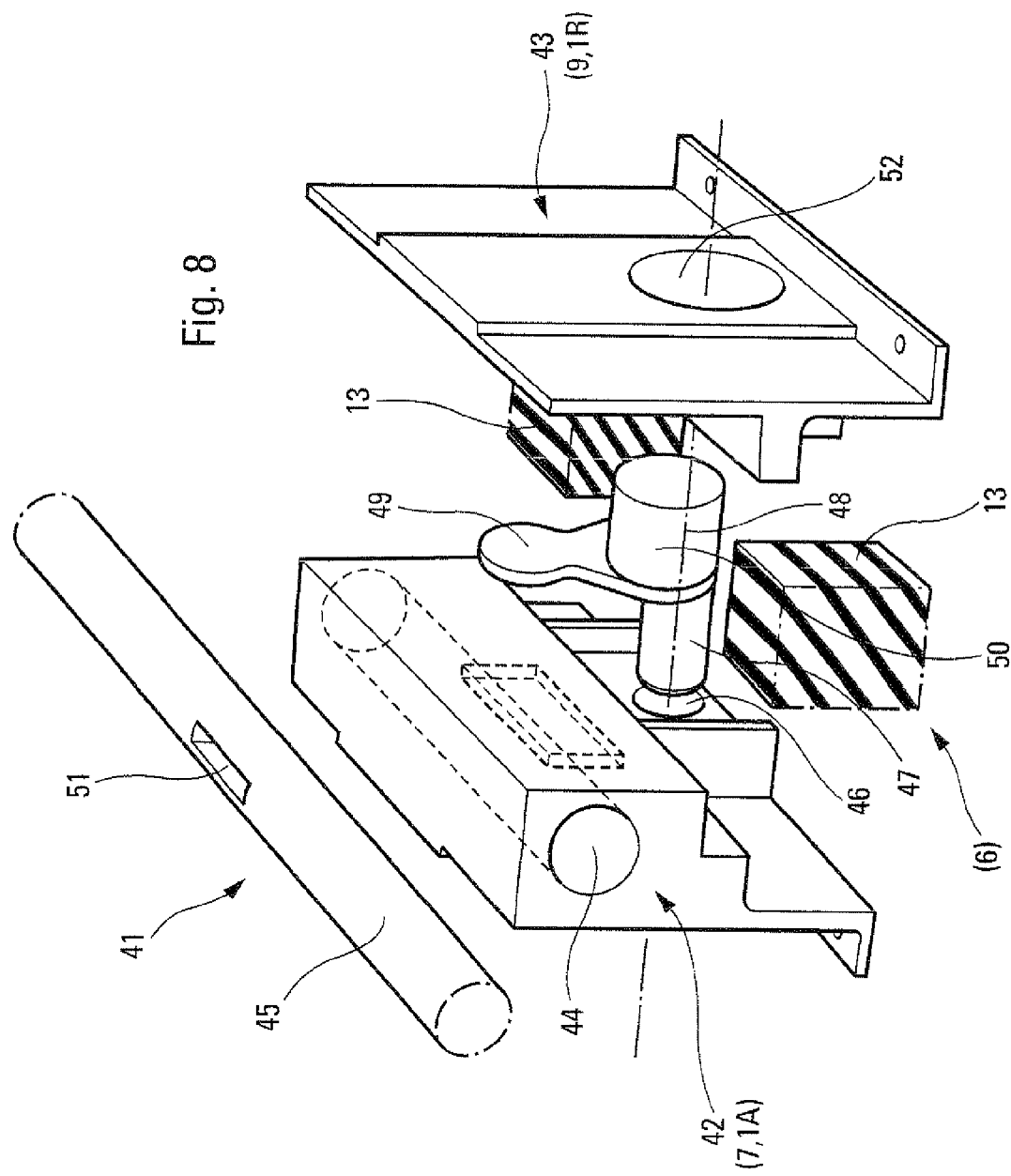
FIG. 8 is an exploded schematic perspective view of a mechanical embodiment of the actuating means for the elongated aerodynamic element of the invention.

FIGS. 8 and 9 show a mechanical type actuator device 41, which can be used instead of each of the hydraulic devices 31 of FIGS. 6 and 7.

Each actuator device 41 includes a front block 42 integral with the leading edge spar 7 (and therefore with the front longitudinal portion 1A) and a rear block 43 integral with the lower surface spar (and therefore with the rear longitudinal portion 1R).

The front block 42 is provided with a sliding guide 44 for a rod 45, parallel to the span E and the slot 6, as well as a bearing 46 for a shaft 47, the axis 48 of which is orthogonal to the rod 45.

The shaft 47 carries a crank pin 49 and an eccentric core 50. The crank pin 49 is engaged with the rod 45, for example through a slot 51, whereas the eccentric core 50 is soft-frictionally engaged in an oval opening 52, made in the rear block 43.

Thus, as schematically illustrated in FIG. 9, when the rod 45 slides within the guide 44 thereof (double arrow 53), the crank pin 49 swings about the axis 48 (double arrow 54) driving the eccentric core 50, such that this results (double arrow 55) in a relative sliding of blocks 42 and 43 (and therefore of spars 7 and 9 and longitudinal portions 1A and 1R) in parallel to the rod 45 (and therefore to the slot 6).

It will be noticed:
that a plurality of actuator devices (or units) 41 distributed along the span E of the aerodynamic element can be controlled by the same rod 45, in turn slidingly controlled by any suitable means; and
that, since the amplitude of the relative sliding 55 between the blocks 42 and 43 depends on the eccentricity of the core 50, each actuator device 41 can be provided with a particular eccentric core 50 capable of locally transmitting a desired torsion, optionally different from the one generated by the actuator devices located on either side.

The invention claimed is:

1. An elongated aerodynamic element, comprising an aircraft wing or a rotary wing blade, provided with an upper aerodynamic surface and a lower aerodynamic surface defining therebetween a leading edge and a trailing edge, said aerodynamic element being capable of being torsion-deformed along an axis directed at least approximately along the span of said aerodynamic element and including, connected to each other, a front longitudinal portion including said leading edge and a rear longitudinal portion including said trailing edge, with a torsion of said aerodynamic element being associated with a relative sliding of said longitudinal portions at least substantially parallel to said span,
wherein:

one of said upper or lower aerodynamic surfaces is continuous and provides a linking between said front and rear longitudinal portions;

the other of said aerodynamic surfaces is partitioned, on the side of said leading edge, by a longitudinal slot directed at least approximately along said span and separating said front and rear longitudinal portions from each other, the slot defining edges along the front and rear longitudinal portions with one of the edges being part of one of said longitudinal portions whereas the other of said edges is part of the other longitudinal portion; and inside said aerodynamic element, are provided inner actuating means capable of causing a relative sliding between said edges defined by the slot.

2. The aerodynamic element according to claim 1, wherein said continuous aerodynamic surface is the upper surface of said aerodynamic element, said longitudinal slot being within the lower surface thereof.

3. The aerodynamic element according to any of claim 1 wherein said longitudinal slot is sealed by a tape of a low elasticity modulus material.

4. The aerodynamic element according to claim 1 wherein said torsion axis is provided in the chord plane of said aerodynamic element.

5. The aerodynamic element according to claim 4, made of a rotary wing blade, wherein said torsion axis is, in the chord plane of said blade, at a distance from said leading edge of at least approximately one fourth of the chord of said blade.

6. The aerodynamic element according to claim 1 wherein said inner actuating means are made of a single actuator extended along the span of said element.

7. The aerodynamic element according to claim 1 wherein said inner actuating means are made of several actuators distributed along the span of said element.

8. The aerodynamic element according to claim 7, wherein said inner actuating means include a plurality of single actuators of the hydraulic type, each single actuator including at least one jack integral with one of said longitudinal portions and capable of moving a slider integral with the other longitudinal portion in parallel to the span of said aerodynamic element.

9. The aerodynamic element according to claim 7 wherein said inner actuating means include a plurality of single actuators of the mechanical type, each single actuator including an eccentric rotatably mounted relative to one of the longitudinal portions and cooperating with the other longitudinal portion in order to generate the relative sliding between said longitudinal portions.

10. The aerodynamic element according to claim 9, wherein said eccentric is controlled by a control rod slidingly guided in said longitudinal portion on which said eccentric is rotatably mounted.

11. The aerodynamic element according to claim 1 wherein said inner actuating means are of the piezoelectric type, with a multilayer structure capable of a planar shear deformation.

12. The aerodynamic element according to claim 11, wherein said piezoelectric actuating means are at least partly provided in the chord plane of said aerodynamic element.

\* \* \* \* \*